United States Patent
Ishikawara et al.

(10) Patent No.: US 12,043,306 B2
(45) Date of Patent: Jul. 23, 2024

(54) MAGNETIC SENSOR, BRAKE SYSTEM USING THE SAME, AND STEERING SYSTEM USING THE SAME

(71) Applicant: TDK Corporation, Tokyo (JP)

(72) Inventors: Toshio Ishikawara, Tokyo (JP); Toshihiko Oyama, Tokyo (JP); Takahiro Moriya, Tokyo (JP); Keiji Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 100 days.

(21) Appl. No.: 17/730,672

(22) Filed: Apr. 27, 2022

(65) Prior Publication Data

US 2022/0402547 A1 Dec. 22, 2022

(30) Foreign Application Priority Data

Jun. 21, 2021 (JP) .................... 2021-102503

(51) Int. Cl.
*G01D 5/14* (2006.01)
*B62D 15/02* (2006.01)
*F16D 66/00* (2006.01)

(52) U.S. Cl.
CPC ......... *B62D 15/0225* (2013.01); *G01D 5/145* (2013.01); *F16D 2066/003* (2013.01)

(58) Field of Classification Search
CPC .................................................. G01D 5/145
See application file for complete search history.

(56) References Cited

U.S. PATENT DOCUMENTS

| | | | |
|---|---|---|---|
| 8,896,294 B2 | 11/2014 | Fukuoka et al. | |
| 2004/0140796 A1 | 7/2004 | Okubo et al. | |
| 2011/0248705 A1* | 10/2011 | Matsumoto | G01D 5/145 |
| | | | 324/207.2 |
| 2014/0103915 A1* | 4/2014 | Satz | G01R 33/0011 |
| | | | 324/207.25 |
| 2016/0297468 A1 | 10/2016 | Izutani et al. | |
| 2018/0216925 A1 | 8/2018 | Yasuda | |

FOREIGN PATENT DOCUMENTS

| | | |
|---|---|---|
| JP | H05-133704 A | 5/1993 |
| JP | H07-83698 A | 3/1995 |
| JP | H07-146102 A | 6/1995 |
| JP | H08-189932 A | 7/1996 |
| JP | H11-211410 A | 8/1999 |
| JP | 2004-245823 A | 9/2004 |

(Continued)

*Primary Examiner* — Reena Aurora
(74) *Attorney, Agent, or Firm* — Posz Law Group, PLC (57) ABSTRACT

The present invention aims at providing A magnetic sensor that is less expensive and that is highly sensitive is provided. A magnetic sensor of the present invention has: a magnetic field detecting element; and a plurality of magnets that are arranged at intervals in a first direction, the magnets moving in the first direction relative to the magnetic field detecting element. The magnets have respective first faces that face the magnetic field detecting element. The magnets are magnetized in a second direction that crosses the first direction such that the first faces of an adjacent pair of the magnets have different polarities. The magnetic sensor further includes at least one soft magnetic body that is provided on the first face of at least one of the magnets.

14 Claims, 13 Drawing Sheets

(56) References Cited

FOREIGN PATENT DOCUMENTS

| | | |
|---|---|---|
| JP | 2009-192261 A | 8/2009 |
| JP | 5013146 B2 | 8/2012 |
| JP | 2013-238485 A | 11/2013 |
| JP | 3191530 U | 6/2014 |
| JP | 2016-199185 A | 12/2016 |
| JP | 6492193 B2 | 3/2019 |

* cited by examiner

| | Comp.Example 1 | Comp.Example 2 |
|---|---|---|
| Magnetic flux distribution | | |
| Arrangement — Magnet | rectangular parallelopiped | Curve first surface |
| Arrangement — Soft magnetic body | - | - |
| Max. magnetic flux density (mT) | 88.4 | 82.2 |
| Min. magnetic flux density (mT) | 39.8 | 36.6 |
| Error(%) | 0.584 | 0.534 |
| Vol. of magnet | 100 | 93.6 |

| | Example 1 | Example 2 |
|---|---|---|
| Magnetic flux distribution | | |
| Arrangement — Magnet | rectangular parallelopiped magnet + semi-ellipse soft magnetic body | |
| Arrangement — Soft magnetic body | Semi-ellipse | First soft magnetic body: quarter ellipse; Second soft magnetic body: semi-ellipse |
| Max. magnetic flux density (mT) | 88.9 | 89.0 |
| Min. magnetic flux density (mT) | 40.6 | 40.0 |
| Error(%) | 0.570 | 0.563 |
| Vol. of magnet | 75 | 75 |

MAGNETIC SENSOR, BRAKE SYSTEM USING THE SAME, AND STEERING SYSTEM USING THE SAME

BACKGROUND OF THE INVENTION

1. Field of the Invention

The present application is based on, and claims priority from, JP2021-102503, filed on Jun. 21, 2021, the disclosure of which is hereby incorporated by reference herein in its entirety.

The present invention relates to a magnetic sensor, a brake system using the magnetic sensor, and a steering system using the magnetic sensor, and particularly relates to a stroke sensor.

2. Description of the Related Art

There is known a stroke sensor that measures the displacement of an object that is movable in one direction. JP5013146 discloses a magnetic sensor having magnets that are arranged in one direction at intervals and that move relative to a magnetic field detecting element. Arranging the magnets at intervals can improve the measurement accuracy as compared to a magnetic sensor in which magnetic pole surfaces of adjacent magnets are in contact with each other. JP6492193 discloses a stroke sensor having a similar arrangement in which the surface of a magnet that faces a magnetic field detecting portion is rounded and protrudes toward the magnetic field detecting portion. JP2013-238485 discloses an encoder having an elongated magnet. The surface of the magnet that faces a magnetic sensor is an elongated N pole, which is covered by a yoke. The yoke has protrusions and recesses that are formed on the surface thereof along the long axis of the magnet.

SUMMARY OF THE INVENTION

Since magnets are expensive, it is preferable to limit the volume of magnets as much as possible. For that purpose, the end surfaces of the magnets that are disclosed in JP5013146 may be rounded in the same manner as the magnet that is disclosed in JP6492193. This arrangement is effective for limiting the volume of the magnets but requires high processing costs because magnets are generally hard. If protrusions and recesses are provided on a yoke in the same manner as the encoder of JP2013-238485, then the magnetic field is determined by the shape of the protrusions and recesses of the yoke. In this case, however, it is difficult to ensure a sufficient change in magnetic flux density, especially a sufficient difference between the maximum magnetic flux density and the minimum magnetic flux density, and as a result, sufficient sensitivity cannot be obtained.

The present invention aims at providing a magnetic sensor that is less expensive and that is highly sensitive.

A magnetic sensor of the present invention comprises: a magnetic field detecting element; and a plurality of magnets that are arranged at intervals in a first direction, the magnets moving in the first direction relative to the magnetic field detecting element. The magnets have respective first faces that face the magnetic field detecting element. The magnets are magnetized in a second direction that crosses the first direction such that the first faces of an adjacent pair of the magnets have different polarities. The magnetic sensor further comprises at least one soft magnetic body that is provided on the first face of at least one of the magnets.

According to the present invention, it is possible to provide a magnetic sensor that is less expensive and that is highly sensitive.

The above and other objects, features and advantages of the present invention will become apparent from the following description with reference to the accompanying drawings that illustrate examples of the present invention.

DESCRIPTION OF EMBODIMENTS

Figure 1A:
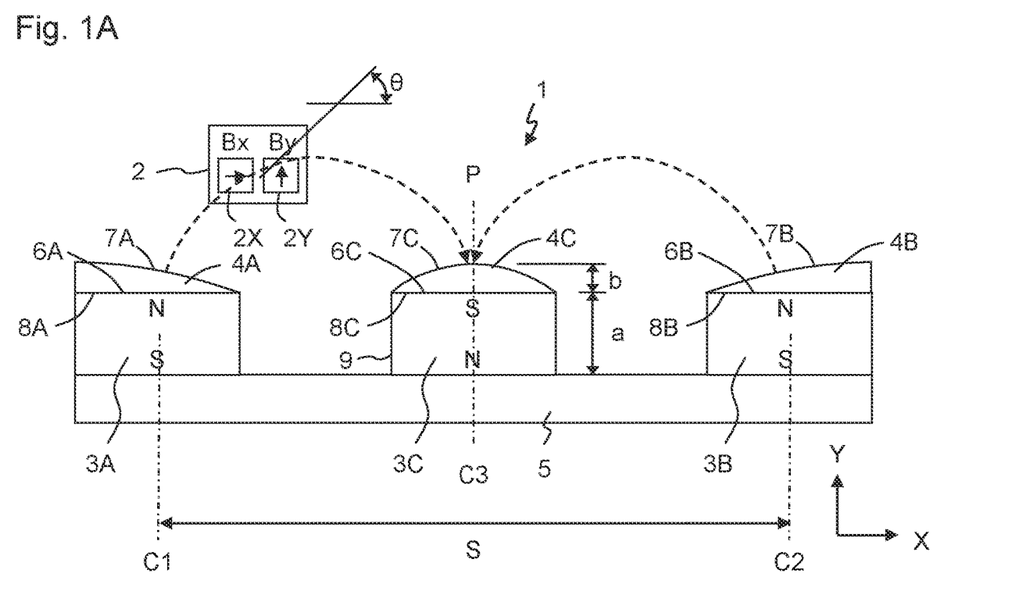
FIG. 1A is a view schematically illustrating the arrangement of a magnetic sensor according to a first embodiment of the present invention.

Some embodiments of the present invention will now be described with reference to the drawings. In the following descriptions, first direction X is a direction in which magnets move relative to the magnetic field detecting element and in which the magnets are arranged at intervals. Second direction Y is a direction in which the magnets are magnetized and that crosses first direction X (that is perpendicular to first direction X in the embodiments). FIG. 1A shows a schematic view illustrating the arrangement of magnetic sensor 1 according to the first embodiment of the present invention. Magnetic sensor 1 has magnetic field detecting element 2, a plurality of magnets 3A to 3C, soft magnetic bodies 4A to 4C that are provided on magnets 3A to 3C, respectively, and common yoke 5 that interconnects magnets 3A to 3C. Magnets 3A to 3C, soft magnetic bodies 4A to 4C, and common yoke 5 are sealed with resin (not illustrated). Magnets 3A to 3C include two first magnets 3A and 3B and one second magnet 3C. First and second magnets 3A to 3C have generally rectangular parallelepiped shapes having the same dimensions and are formed of magnetic material such as neodymium. First and second magnets 3A to 3C are not limited to rectangular parallelepiped shapes and preferably have constant sections in second direction Y, such as cylindrical shapes. Such a shape can limit the manufacturing cost of magnets 3A to 3C.

Magnets 3A to 3C are arranged in first direction X at intervals, and the positions thereof are fixed relative to each other. Second magnet 3C is positioned between two first magnets 3A and 3B. Center C3 of second magnet 3C in first direction X is equidistant from centers C1 and C2 of two first magnets 3A and 3B in first direction X. Accordingly, the gap between first magnet 3A and second magnet 3C is equal to the gap between first magnet 3B and second magnet 3C. Common yoke 5 is formed of soft magnetic material such as NiFe. Common yoke 5 increases the magnetic flux density in the vicinity of magnets 3A to 3C and is also used to position first magnets 3A and 3B and second magnet 3C. Two first magnets 3A and 3B and second magnet 3C move in first direction X relative to magnetic field detecting element 2. Magnets 3A to 3C can move between a position at which first magnet 3A is opposite to magnetic field detecting element 2 and a position at which first magnet 3B is opposite to magnetic field detecting element, and the distance between the two above-mentioned positions defines stroke S of magnetic sensor 1. In the present embodiment, magnetic field detecting element 2 is fixed and first magnets 3A and 3B and second magnet 3C are movable, but magnetic field detecting element 2 may be movable and first magnets 3A and 3B and second magnet 3C may be fixed.

Magnetic field detecting element 2 includes first magnetic field detecting element 2X that has an axis of sensitivity in first direction X and second magnetic field detecting element 2Y that has an axis of sensitivity in second direction Y. The type of first magnetic field detecting element 2X and second magnetic field detecting element 2Y is not limited as long as these magnetic field detecting elements can detect a magnetic field, but a Hall element or a magnetoresistive effect element such as a tunnel magnetoresistance effect (TMR) element may be used. First magnetic field detecting element 2X detects magnetic flux density Bx in first direction X, and second magnetic field detecting element 2Y detects magnetic flux density By in second direction Y. Accordingly, angle θ of the magnetic flux at the position of magnetic field detecting element 2 can be obtained by calculating "atan" (By/Bx). Since the relative positions of first and second magnets 3A to 3C in first direction X with respect to the position of magnetic field detecting element 2 in first direction X are correlated with angle θ, the relative positions can be obtained from angle θ. Provision of second magnet 3C enables angle θ of the magnetic flux to vary between 0 degree and 360 degrees within stroke S, whereby the accuracy of magnetic sensor 1 can be enhanced.

Two first magnets 3A and 3B and second magnet 3C have first faces 6A to 6C that each face magnetic field detecting element 2. Two first magnets 3A and 3B and second magnet 3C are magnetized in second direction Y. An adjacent pair of the magnets are magnetized such that the first faces of the adjacent pair of the magnets have different polarities. In the present embodiment, first faces 6A and 6B of two first magnets 3A and 3B are the N poles and first face 6C of second magnet 3C is the S pole, but alternatively, first faces 6A, 6B of two first magnets 3A and 3B may be the S poles and first face 6C of second magnet 3C may be the N pole.

Two first magnets 3A and 3B are provided with two first soft magnetic bodies 4A and 4B, respectively, and second magnet 3C is provided with second soft magnetic body 4C. First soft magnetic bodies 4A and 4B and second soft magnetic body 4C are formed of soft magnetic material such as NiFe and have a function as yokes that limit the diffusion of magnetic flux that enters and exits from first magnets 3A and 3B and second magnet 3C. In other words, first soft magnetic bodies 4A and 4B and second soft magnetic body 4C guide the magnetic flux that enters and exits from first magnets 3A and 3B and second magnet 3C and function substantially as a part of first magnets 3A and 3B and second magnet 3. Since the direction of the magnetic flux is determined by the shapes of soft magnetic bodies 4A to 4C, first magnets 3A and 3B and second magnet 3C may have simple shapes, and the use of simple shapes can reduce the manufacturing cost.

First and second soft magnetic bodies 4A to 4C have curved second surfaces 7A to 7C that face magnetic field detecting element 2 and third surfaces 8A to 8C that are in contact with first faces 6A to 6C of first and second magnets 3A to 3C, respectively. First and second magnets 3A to 3C have the same height "a" (the dimension in the Y direction), and first and second soft magnetic bodies 4A to 4C have the same height "b" (the dimension in the Y direction). As will be described later, the ratio b/a is preferably 1 or less (excluding 0) and more preferably 0.5 or less (excluding 0), wherein "a" is the height of first and second magnets 3A to 3C and "b" is the height of first and second soft magnetic bodies 4A to 4C.

First and second soft magnetic bodies 4A to 4C are separately manufactured and are attracted to first faces 6A to 6C of first and second magnets 3A to 3C by magnetic force while being grasped and positioned by a jig. Thereafter, first and second soft magnetic bodies 4A to 4C are secured and fixed to first and second magnets 3A to 3C by means of insert molding using resin. Accordingly, no adhesive is required to attach first and second soft magnetic bodies 4A to 4C to first and second magnets 3A to 3C. First and second soft magnetic bodies 4A to 4C are only provided on first faces 6A to 6C of first and second magnets 3A to 3C. That is, first and second soft magnetic bodies 4A to 4C do not require a cap-like shape that covers first faces 6A to 6C and side surfaces 9 of first and second magnets 3A to 3C. Accordingly, the requirements for the accuracy of the dimensions of first and second soft magnetic bodies 4A to 4C are eased, and the process of manufacturing first and second soft magnetic bodies 4A to 4C, as well as the process of attaching first and second soft magnetic bodies 4A to 4C to first and second magnets 3A to 3C, are significantly facilitated.

Two first soft magnetic bodies 4A and 4B are arranged in line symmetry or in mirror symmetry with respect to axis P that is parallel to second direction Y and that is equidistant from two first magnets 3A and 3B. In the present embodiment, axis P coincides with center C3 of second magnet 3C and the center of second soft magnetic body 4C. In addition, second soft magnetic body 4C itself is in line symmetry or in mirror symmetry with respect to axis P. Due to this symmetry, the magnetic flux that enters and exits from soft magnetic bodies 4A to 4C is in line symmetry or in mirror symmetry with respect to axis P. As a result, the magnetic flux in the vicinity of first and second magnets 3A to 3C is in line symmetry or in mirror symmetry with respect to the centers of second magnet 3C and second soft magnetic body 4C, and the linearity of magnetic sensor 1 is improved.

In the present embodiment, the distances in second direction Y between second surfaces 7A and 7B and third surfaces 8A and 8B of first soft magnetic bodies 4A and 4B gradually decrease toward the space between two first soft magnetic bodies 4A and 4B. For example, first soft magnetic bodies 4A and 4B each have a quarter-elliptical shape that is obtained by quartering an ellipse along the long axis and the short axis thereof, or a shape that is obtained by halving a shape defined by a cord and an arc of an ellipse along the line passing through the center of the cord and perpendicular to the cord. Furthermore, the distance in second direction Y between second surface 7C and third surface 8C of second soft magnetic body 4C is maximized at the center of second soft magnetic body 4C in first direction X, then gradually decreases from the center thereof toward both ends thereof in first direction X, and becomes zero at said both ends thereof in first direction X. For example, second soft magnetic body 4C has a semi-ellipse shape that is obtained by halving an ellipse along the long axis thereof, or a shape that is defined by a cord and an arc of an ellipse. Both ends of soft magnetic bodies 4A to 4C in first direction X coincide with both ends of magnets 3A to 3C, respectively, in first direction X.

Figure 1B:
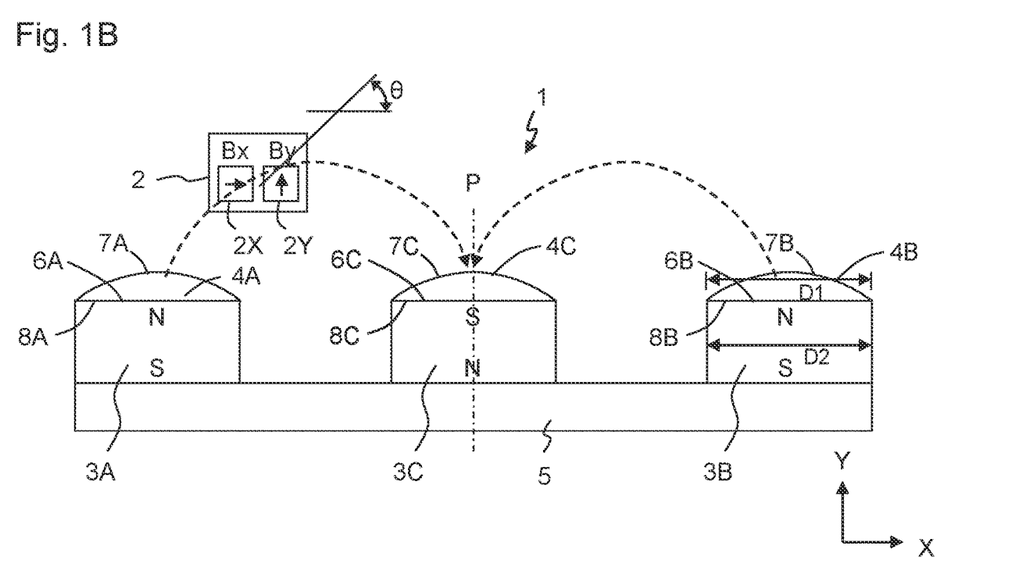
FIG. 1B is a view schematically illustrating the arrangement of a magnetic sensor according to a second embodiment of the present invention.

Alternatively, first soft magnetic bodies 4A and 4B and second soft magnetic body 4C may have the same shape and the same dimensions. For example, as shown in FIG. 1B that illustrates the second embodiment, first soft magnetic bodies 4A and 4B may have the same shape as second soft magnetic body 4C shown in FIG. 1A. In this case, soft magnetic bodies 4A to 4C can be formed in one shape, and the manufacturing process is therefore simplified.

Figure 1C:
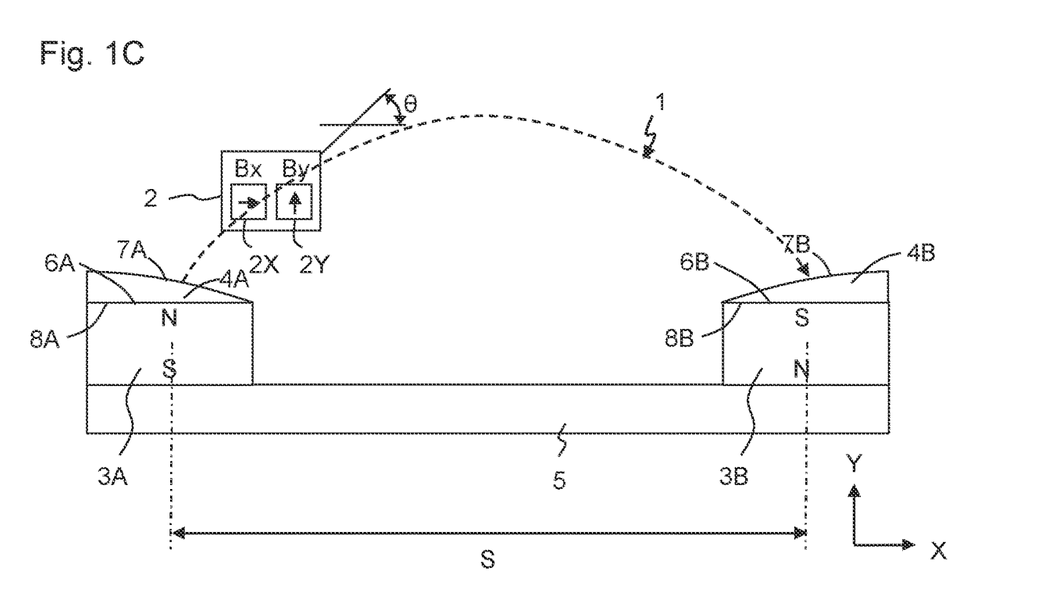
FIG. 1C is a view schematically illustrating the arrangement of a magnetic sensor according to a third embodiment of the present invention.
Figure 2A:
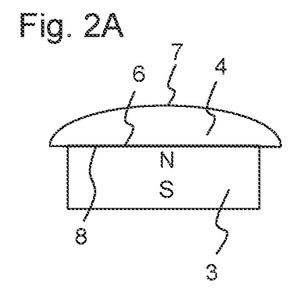
FIGS. 2A to 2L are schematic views illustrating various forms of a soft magnetic body.
Figure 2B:
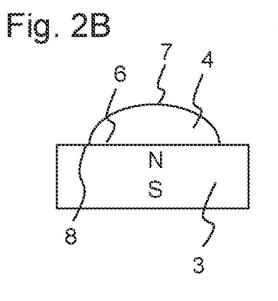

First and second soft magnetic bodies 4A to 4C may have various shapes other than the quarter-elliptical shape or the semi-ellipse shape. FIGS. 2A to 2L show various shapes that first and second soft magnetic bodies 4A to 4C may have. Each of FIGS. 2A to 2L is a schematic view as seen from the same direction as in FIGS. 1A to 1C. In the following descriptions, magnets 3A to 3C are referred to as magnet 3, soft magnetic bodies 4A to 4C are referred to as soft magnetic body 4, and so on. Referring to FIGS. 2A and 2B, the distance in second direction Y between second surface 7 and third surface 8 is maximized at the center of soft magnetic body 4 in first direction X, then gradually decreases from the center thereof toward both ends thereof in first direction X and becomes zero at both ends thereof in first direction X in the same manner as second soft magnetic body 4C shown in FIG. 1A. However, both ends of soft magnetic body 4 shown in FIG. 2A protrude from first face 6 of magnet 3 in first direction X, and both ends of soft magnetic body 4 shown in FIG. 2B are positioned within first face 6 of magnet 3.

Figure 2C:
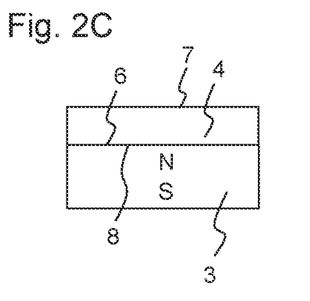
Figure 2D:
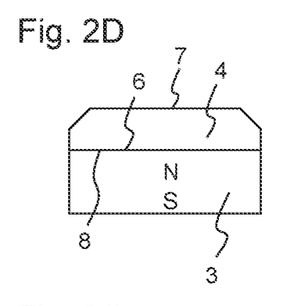
Figure 2E:
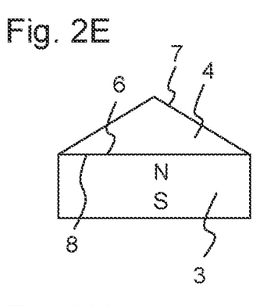
Figure 2F:
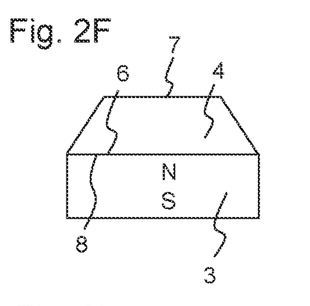
Figure 2G:
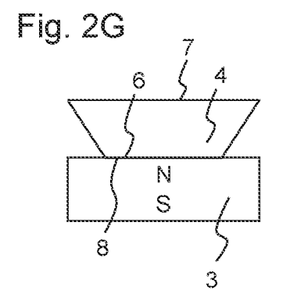
Figure 2H:
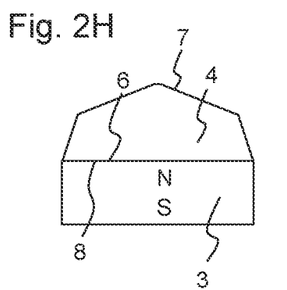
Figure 2I:
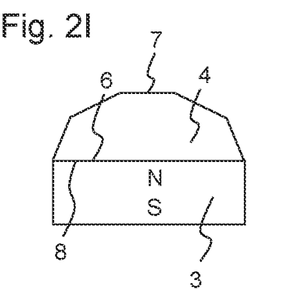
Figure 2J:
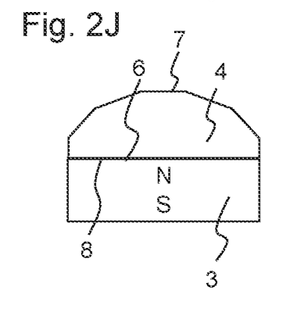

FIG. 2C shows rectangular soft magnetic body 4 in which first face 6 coincides with a long edge of a rectangle. FIG. 2D shows hexagonal soft magnetic body 4 in which the upper vertices on both sides of the rectangle in FIG. 2C are chamfered. FIG. 2E shows isosceles-triangular soft magnetic body 4 in which third surface 8 is the base of the isosceles triangle. FIG. 2F shows trapezoidal soft magnetic body 4 in which third surface 8 is the long edge of the trapezoid and second surface 7 is the short edge of the trapezoid. FIG. 2G shows trapezoidal soft magnetic body 4 in which third surface 8 is the short edge of the trapezoid and second surface 7 is the long edge of the trapezoid. FIG. 2H shows pentagonal soft magnetic body 4 in which third surface 8 is one of the edges of a pentagon. FIG. 2I shows hexagonal soft magnetic body 4 in which third surface 8 is one of the edges of a hexagon. FIG. 2J shows heptagonal soft magnetic body 4 in which third surface 8 is one of the edges of a heptagon. In these examples, soft magnetic body 4 is a polygon that does not protrude in first direction X from either end of the edge of soft magnetic body 4, wherein the edge is superposed on first face 6 of magnet 3 in a plane that includes both first direction X and second direction Y. Such a shape prevents the magnetic flux that enters and exits from magnet 3 from being diffused by soft magnetic body 4.

Figure 2K:
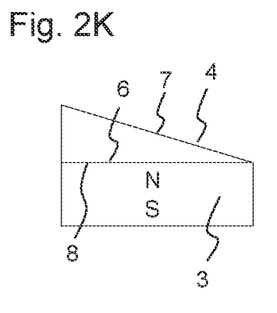
Figure 2L:
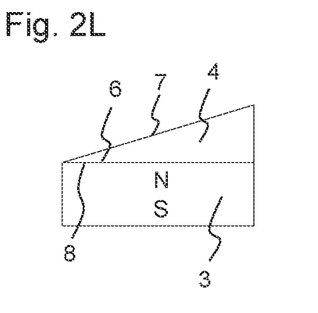
Figure 3A:
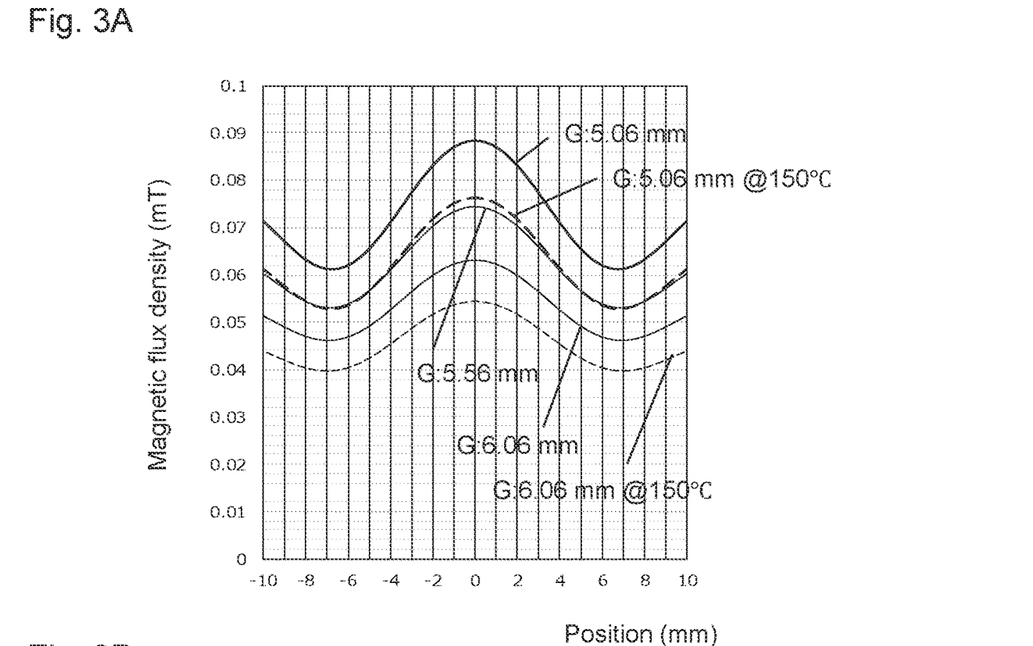
FIGS. 3A and 3B are exemplary calculation results of the magnetic flux density and the error, respectively, in Comparative Example 1.
Figure 3B:
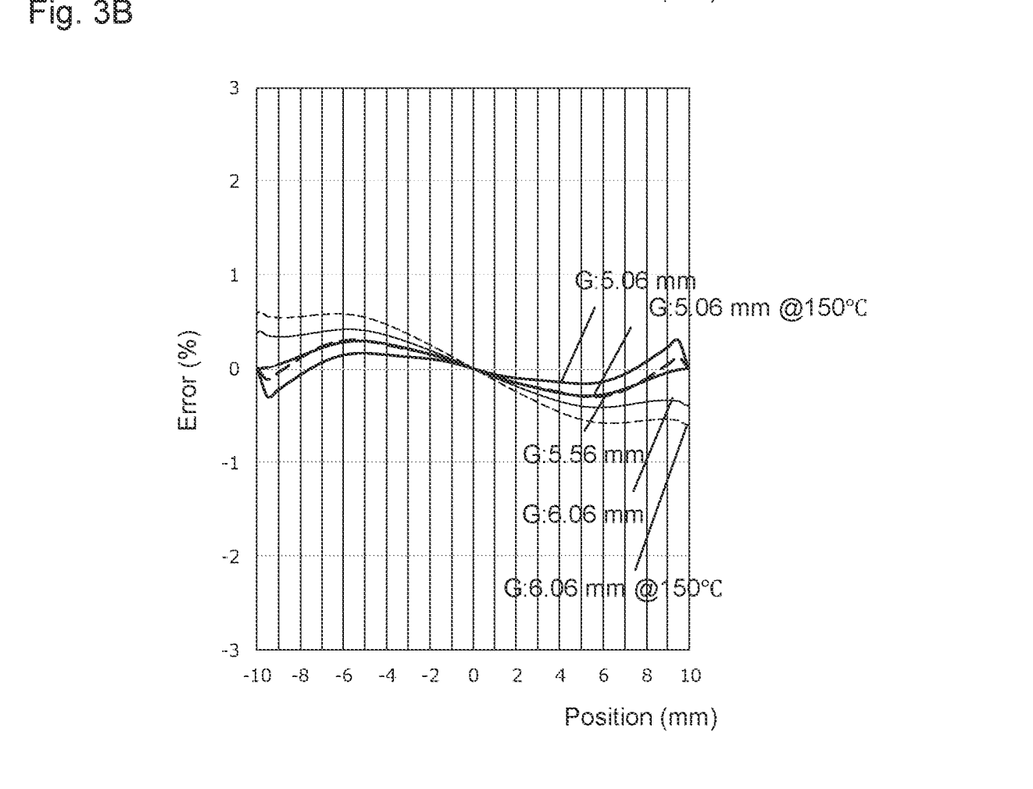
Figure 4A:
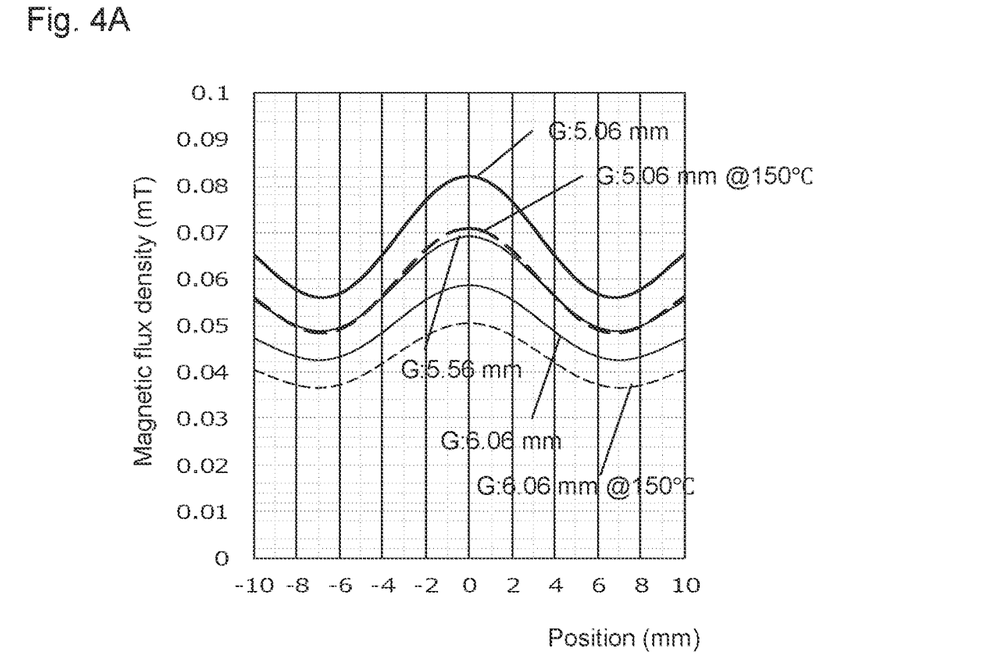
FIGS. 4A and 4B are exemplary calculation results of the magnetic flux density and the error, respectively, in Comparative Example 2.
Figure 4B:
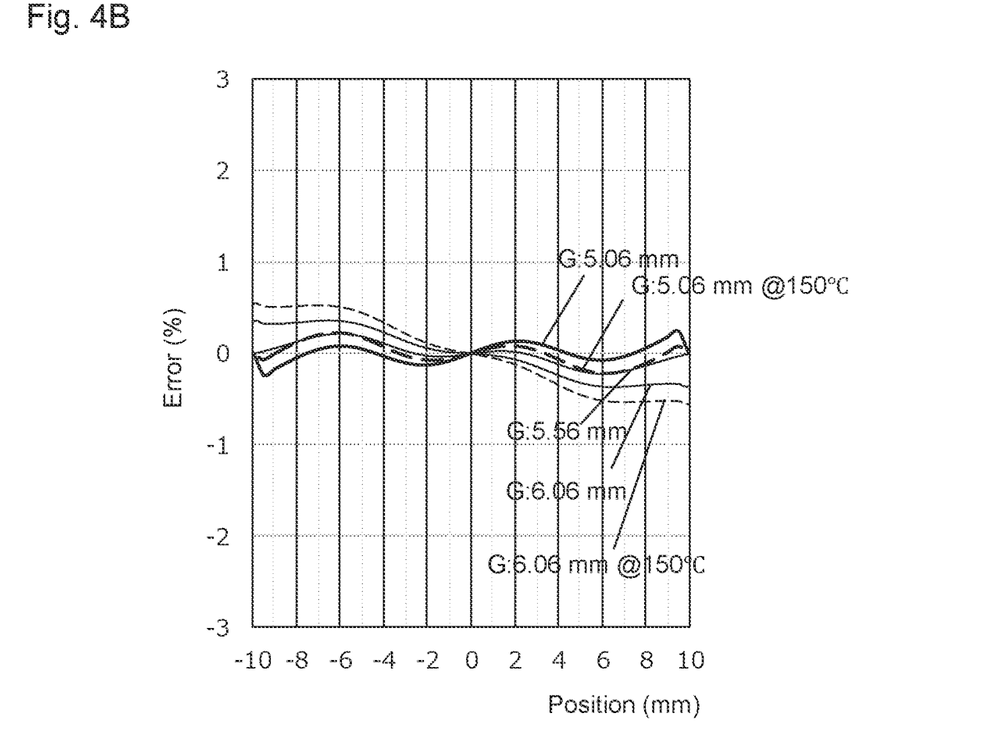
Figure 5A:
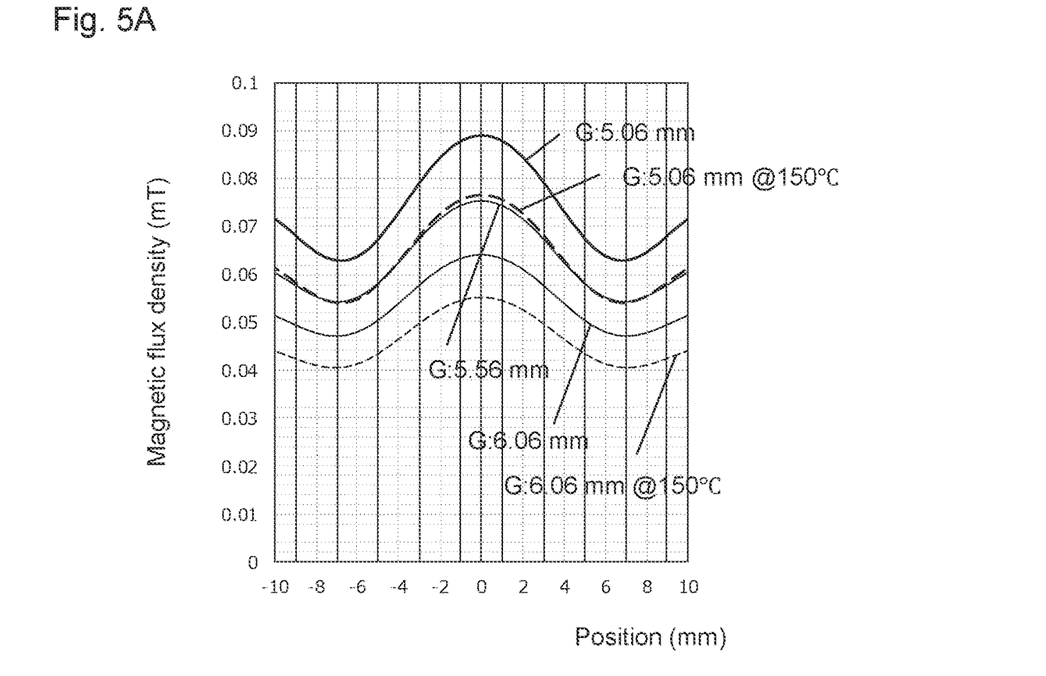
FIGS. 5A and 5B are exemplary calculation results of the magnetic flux density and the error, respectively, in Example 1.
Figure 5B:
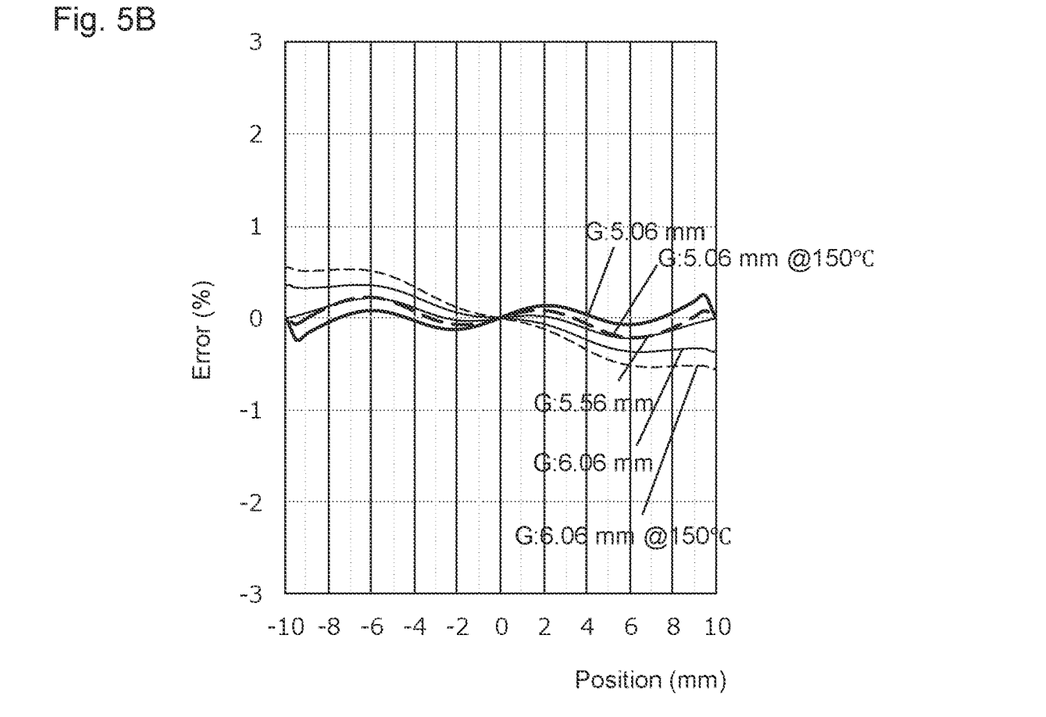
Figure 6A:
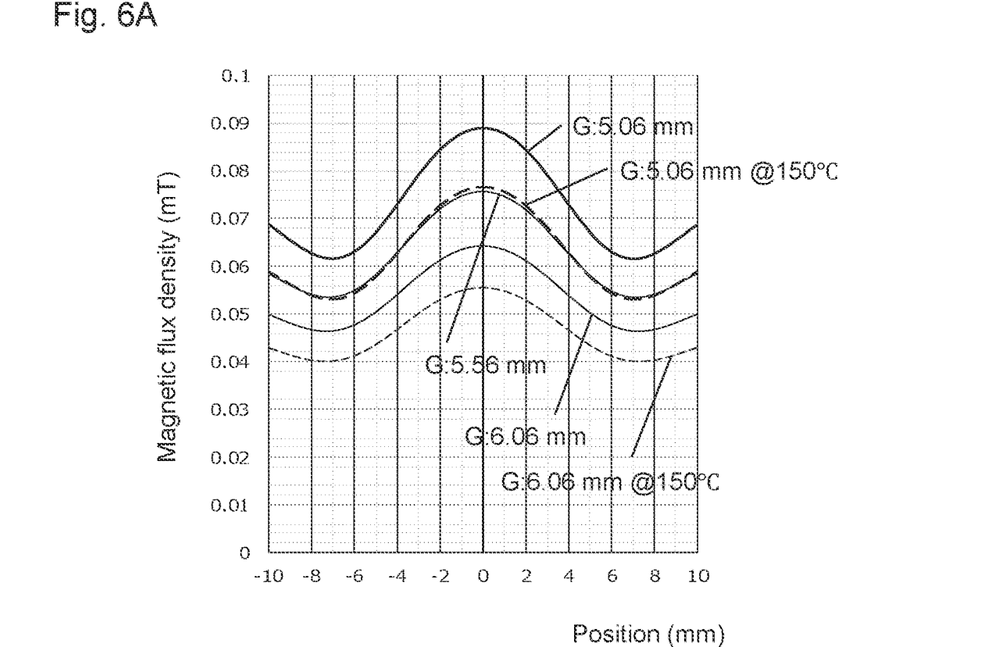
FIGS. 6A and 6B are exemplary calculation results of the magnetic flux density and the error, respectively, in Example 2.
Figure 6B:
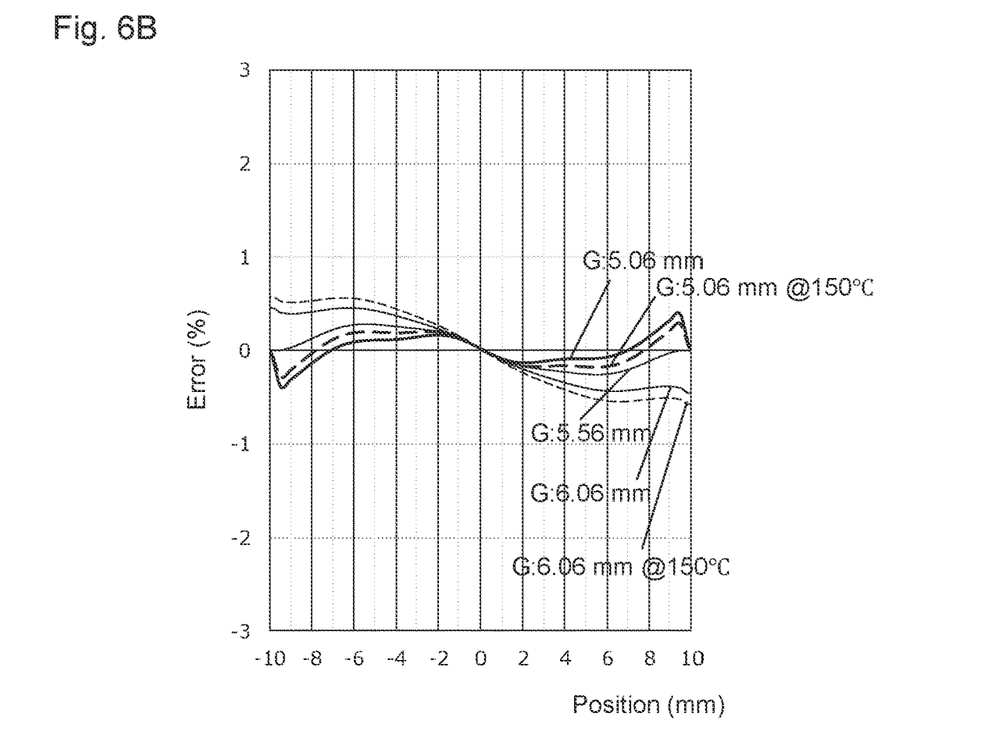

FIG. 2K and FIG. 2L each show right-triangular soft magnetic body 4 in which first face 6 is one of the edges of the right triangle. These soft magnetic bodies 4 are asymmetric with respect to their own center axes and are therefore undesirable as second soft magnetic body 4C but may be used for first soft magnetic bodies 4A and 4B. Soft magnetic body 4 shown in FIG. 2K may be substituted for first soft magnetic body 4A in FIG. 1A, and soft magnetic body 4 shown in FIG. 2L may be substituted for first soft magnetic body 4B in FIG. 1A. The right-angle vertex coincides with the outer end of first face 6.

In the third embodiment shown in FIG. 10, second magnet 3C is omitted, and the of polarity of first magnet 3B is reversed from the of polarity of first magnet 3B of the first and second embodiments (first face 6A of first magnet 3A is the N pole, and first face 6B of first magnet 3B is the S pole). In this case, the relative positions of first magnets 3A and 3B to magnetic field detecting element 2 in first direction X can also be obtained based on the above-described principle. Since second magnet 3C is omitted, θ changes between 0 degree and 180 degrees within stroke S. This is disadvantageous from the viewpoint of the accuracy of magnetic sensor 1, but omitting second magnet 3C leads to a reduction in the cost and size of magnetic sensor 1. Although not illustrated, second magnet 3C may also be omitted in the second embodiment shown in FIG. 1B.

Figure 7A:
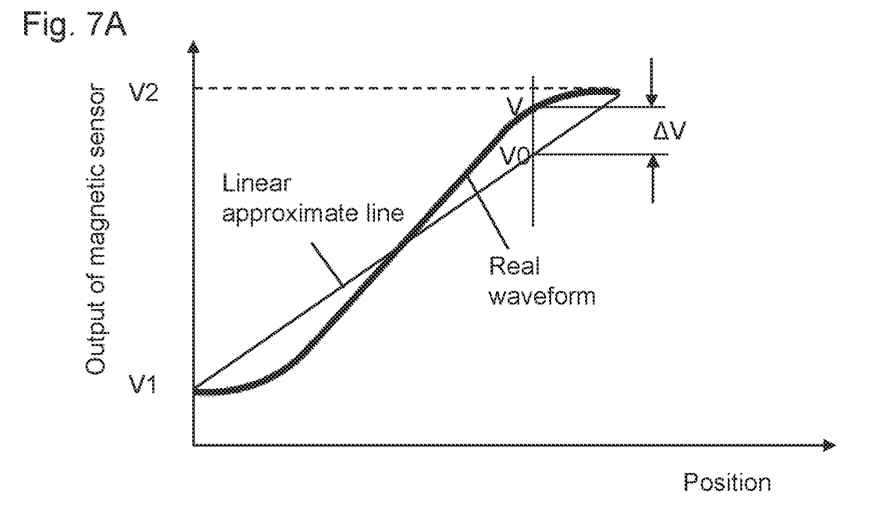
FIGS. 7A and 7B are schematic views illustrating the method of calculating the error.
Figure 7B:
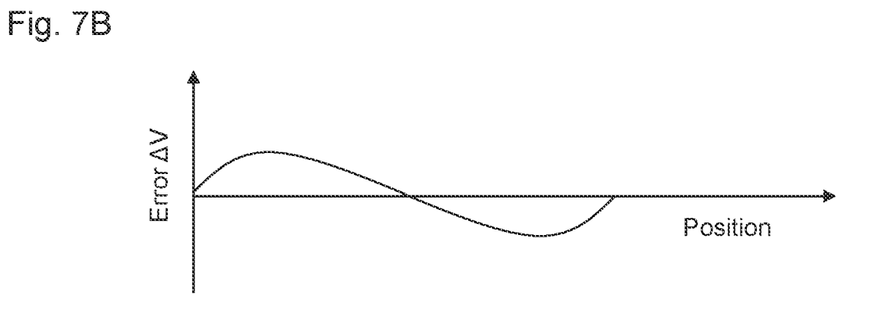
Figure 12:
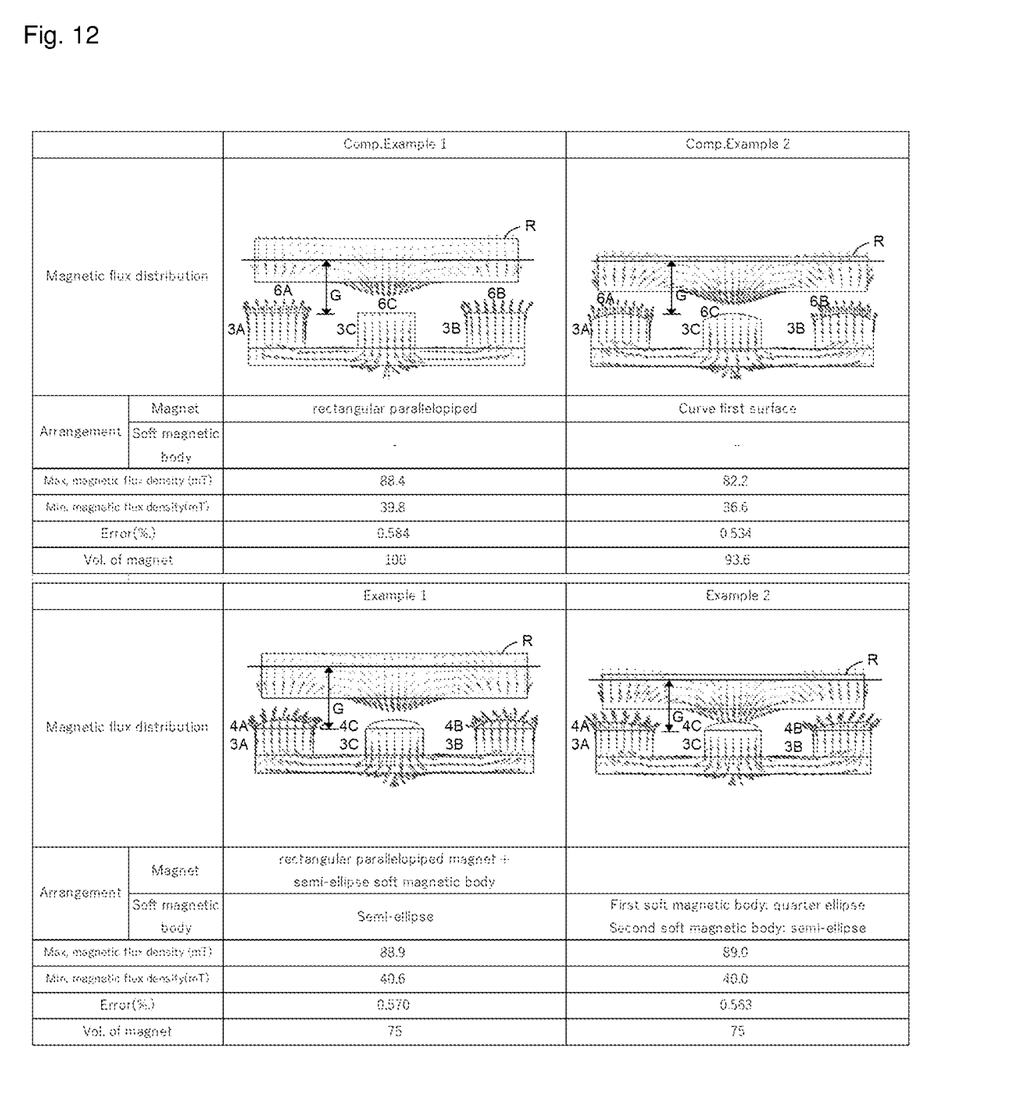
FIG. 12 is a table showing the distribution of magnetic flux density for certain embodiments and Comparative Examples.

Next, the distribution of magnetic flux density was obtained for some of the embodiments mentioned above and Comparative Examples. FIG. 12 summarizes the results. In FIG. 12, rectangular region R shows the calculation region. In Comparative Example 1, the height of first and second magnets 3A to 3C was 4 mm and first faces 6A to 6C were flat. In Comparative Example 2, the height of first and second magnets 3A to 3C was 4 mm and first faces 6A to 6C were curved. In Example 1, the height of first and second magnets 3A to 3C was 3 mm, and soft magnetic bodies 4A to 4C having a thickness of 1 mm and a semi-ellipse-like shape were arranged on second magnets 3A to 3C, respectively. In Example 2, the height of first and second magnets 3A to 3C was 3 mm. Soft magnetic bodies 4A and 4B having a thickness of 1 mm and a quarter-ellipse-like shape were arranged on first magnets 3A and 3B, respectively, and soft magnetic body 4C having a thickness of 1 mm and a semi-ellipse-like shape was arranged on second magnet 3C. FIGS. 3A to 6B show the magnetic flux density and the error as a function of the position in first direction X for each of Comparative Examples 1 and 2 and Examples 1 and 2. Gap G was measured from the tops of the magnets, and the magnetic flux density and the error were obtained for a plurality of gaps G. The temperature was normal, but the magnetic flux density and the error were also obtained at a temperature of 150° C. of the magnets and the soft magnetic bodies for gaps G=5.06 mm and 6.06 mm. A temperature of 150° C. is to be expected under high-temperature conditions such as when used in vehicles. The error was calculated in the following manner. As shown in FIG. 7A, the relationship between the position in first direction X and the output of magnetic sensor 1 was obtained, and then the least square method was used to linearly approximate the relationship between minimum value V1 and maximum value V2 of the real output. As shown in FIG. 7B, the error was calculated as $$\Delta V/(V2-V1)$$

where $\Delta V=V-V0$ is the difference between real output V and output Vo on the linear approximate line.

The maximum magnetic flux densities of Examples 1 and 2 were almost equal, slightly larger than Comparative Example 1, and about 8% larger than Comparative Example 2. The minimum magnetic flux density of Example 1 was slightly larger than the minimum magnetic flux density of Example 2, and the minimum magnetic flux density of Example 2 was substantially the same as the minimum magnetic flux density of Comparative Example 1. The minimum magnetic flux density of Example 1 was about 11% larger than the minimum magnetic flux density of Comparative Example 2. The maximum magnetic flux density may be limited by the guaranteed detection range of magnetic sensor 1, and a large detection range is not always to be desired. On the other hand, a large minimum magnetic flux density can improve the sensitivity of magnetic sensor 1. Comparative Example 2 showed the smallest error, but the error of Examples 1 and 2 was smaller than the error of Comparative Example 1, and the error of Example 2 was smaller than the error of Example 1. Thus, a quarter-elliptical shape is more preferable as the shape of first soft magnetic bodies 4A and 4B. Furthermore, magnets 3A to 3C of Examples 1 and 2 were 25% smaller in volume than in Comparative Example 1 and 20% smaller in volume than in Comparative Example 2. Since the cost of soft magnetic bodies 4A to 4C is lower than the cost of magnets 3A to 3C, the total cost of Examples 1 and 2 was lower than the total cost of Comparative Examples 1 and 2. The magnetic flux density at 150° C. was smaller than the magnetic flux density at normal temperature, and the error was about the same level as that at normal temperature. However, no significant difference was found among Comparative Examples 1 and 2 and Examples 1 and 2.

Figure 8A:
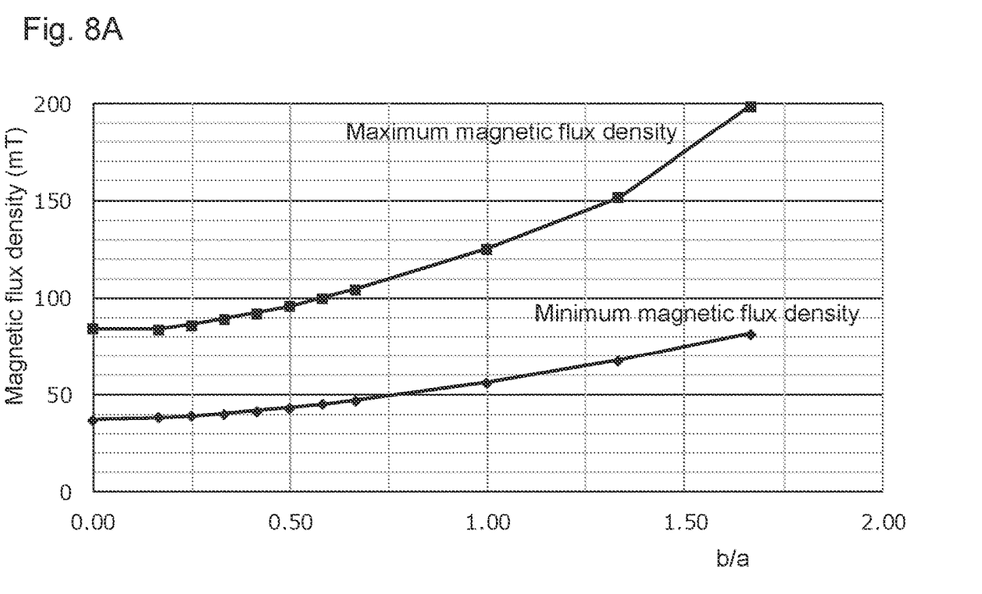
FIGS. 8A and 8B are exemplary calculation results of the magnetic flux density and the error, respectively, for various ratios b/a, where "a" is the height of the magnet and "b" is the height of the soft magnetic body.
Figure 8B:
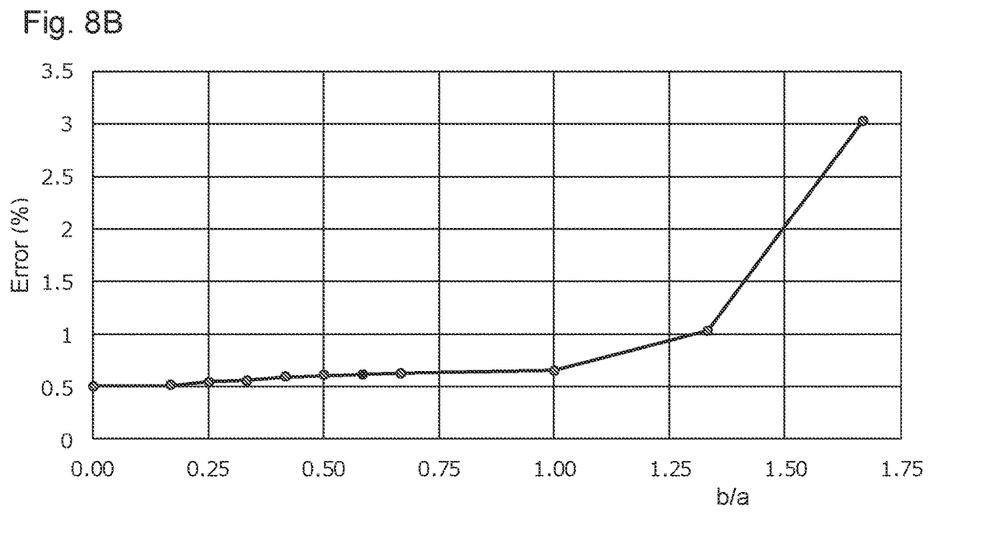
Figure 9A:
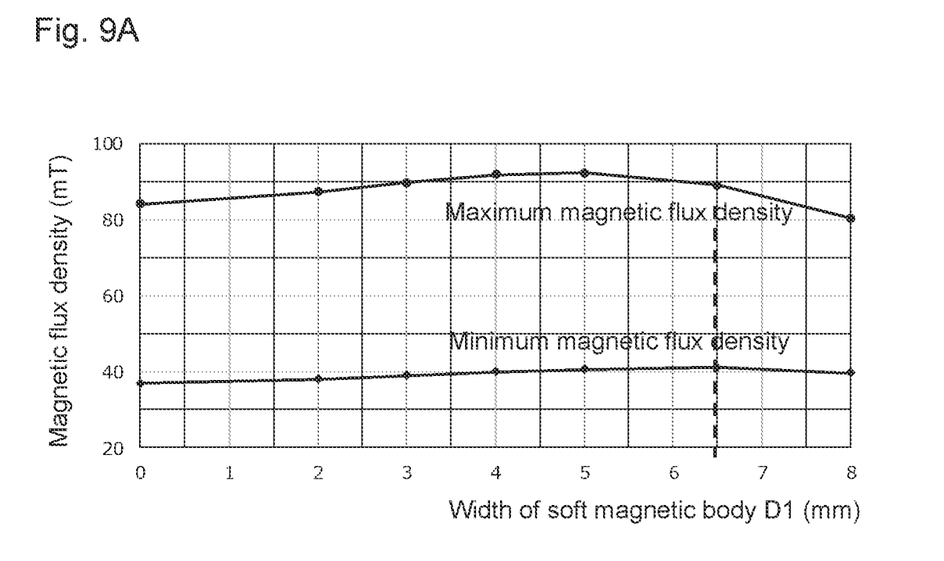
FIGS. 9A and 9B are exemplary calculation results of the magnetic flux density and the error, respectively, for various widths of the magnet.
Figure 9B:
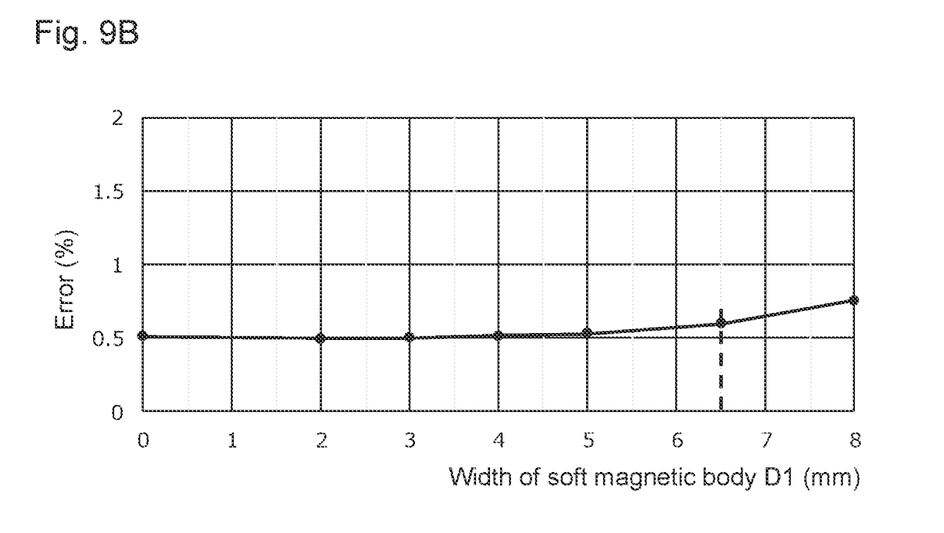

Next, in the first embodiment shown in FIG. 1A, the magnetic flux density and the error were obtained for various ratios b/a, where "a" is the height of first and second magnets 3A to 3C and "b" is the height of first and second soft magnetic bodies 4A to 4C. The total height of first magnet 3A and first soft magnetic body 4A, the total height of first magnet 3B and first soft magnetic body 4B, and the total height of second magnet 3C and second soft magnetic body 4C were kept at 4 mm. As shown in FIG. 8B, the error increased sharply when the ratio b/a exceeded 1. Accordingly, b/a is preferably 1 or less. As shown in FIG. 8A, the maximum magnetic flux density exceeded 100 mT when the ratio b/a was larger than 0.5 and may have exceeded the guaranteed detection range of magnetic sensor 1. Accordingly, b/a is more preferably 0.5 or less.

Next, in the second embodiment shown in FIG. 1B, the magnetic flux density and the error were obtained for various widths D1 (the dimension in first direction X) of first and second soft magnetic bodies 4A to 4C. Widths D2 (dimension in first direction X) of first and second magnets 3A to 3C were 6.5 mm. Therefore, first and second soft magnetic bodies 4A to 4C having widths D1 of 6.5 mm corresponded to FIG. 1B, first and second soft magnetic bodies 4A to 4C having widths D1 larger than 6.5 mm corresponded to FIG. 2A, and first and second soft magnetic bodies 4A to 4C having widths D1 smaller than 6.5 mm corresponded to FIG. 2B. When width D1 is larger than 6.5 mm (FIG. 2A), the maximum magnetic flux density could be reduced while the minimum magnetic flux density was maintained. Accordingly, the magnetic flux density could be easily limited within the guaranteed detection range of magnetic sensor 1. When width D1 was smaller than 6.5 mm (FIG. 2B), the error decreased. In addition, cost can be reduced because the volume of the soft magnetic bodies is reduced.

Although some embodiments have been described above, the present invention is not limited to these embodiments. Magnetic sensor 1 of the present invention may have at least one soft magnetic body 4A to 4C that is provided on first face 6A to 6C of at least one magnet 3A to 3C. For example, first magnets 3A and 3B may be provided with first and second soft magnetic bodies 4A and 4B, respectively, and second magnet 3C may be formed of a magnetic body that includes the portion corresponding to third soft magnetic body 4C.

Figure 10:
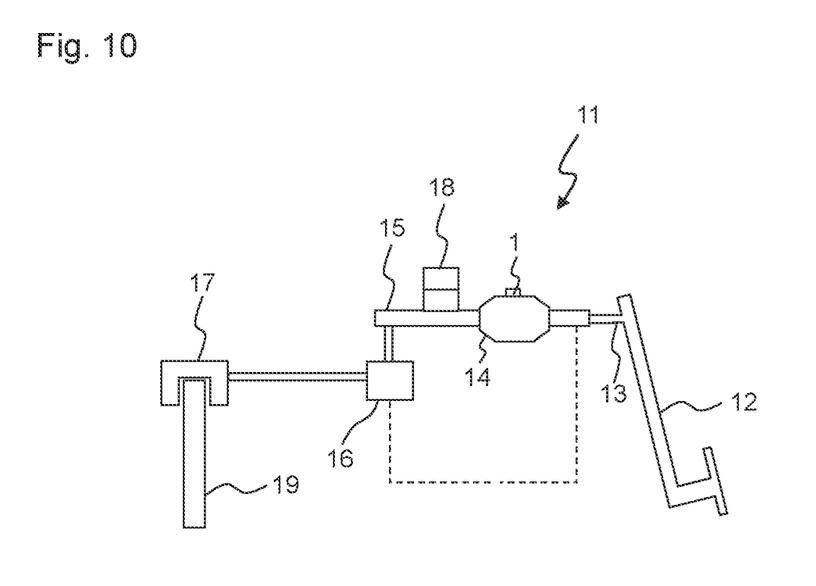
FIG. 10 is a schematic view of a brake system of a vehicle in which the magnetic sensor is used as a stroke sensor.

Magnetic sensor 1 may be used for various uses such as a stroke sensor. FIG. 10 shows vehicle brake system 11 in which magnetic sensor 1 is used as a stroke sensor. Brake system 11 includes brake pedal 12, booster 14 that is connected to brake pedal 12 via connecting member 13, master cylinder 15 that is connected to booster 14, hydraulic control circuit 16 that is connected to master cylinder 15, and caliper 17 that is connected to hydraulic control circuit 16. Reservoir tank 18 is connected to master cylinder 15. First magnets 3A and 3B and second magnet 3C of magnetic sensor 1 are fixed to booster 14. Magnetic field detecting element 2 is fixed to the vehicle body (not illustrated). Braking force that is inputted from brake pedal 12 is amplified by booster 14 and is then transmitted to hydraulic control circuit 16. The amount of depression of brake pedal 12, which is detected by magnetic sensor 1, is also transmitted to hydraulic control circuit 16. Hydraulic control circuit 16 supplies the brake fluid to caliper 17 depending on the amount of the depression of brake pedal 12. Caliper 17 stops brake disc 19.

Figure 11:
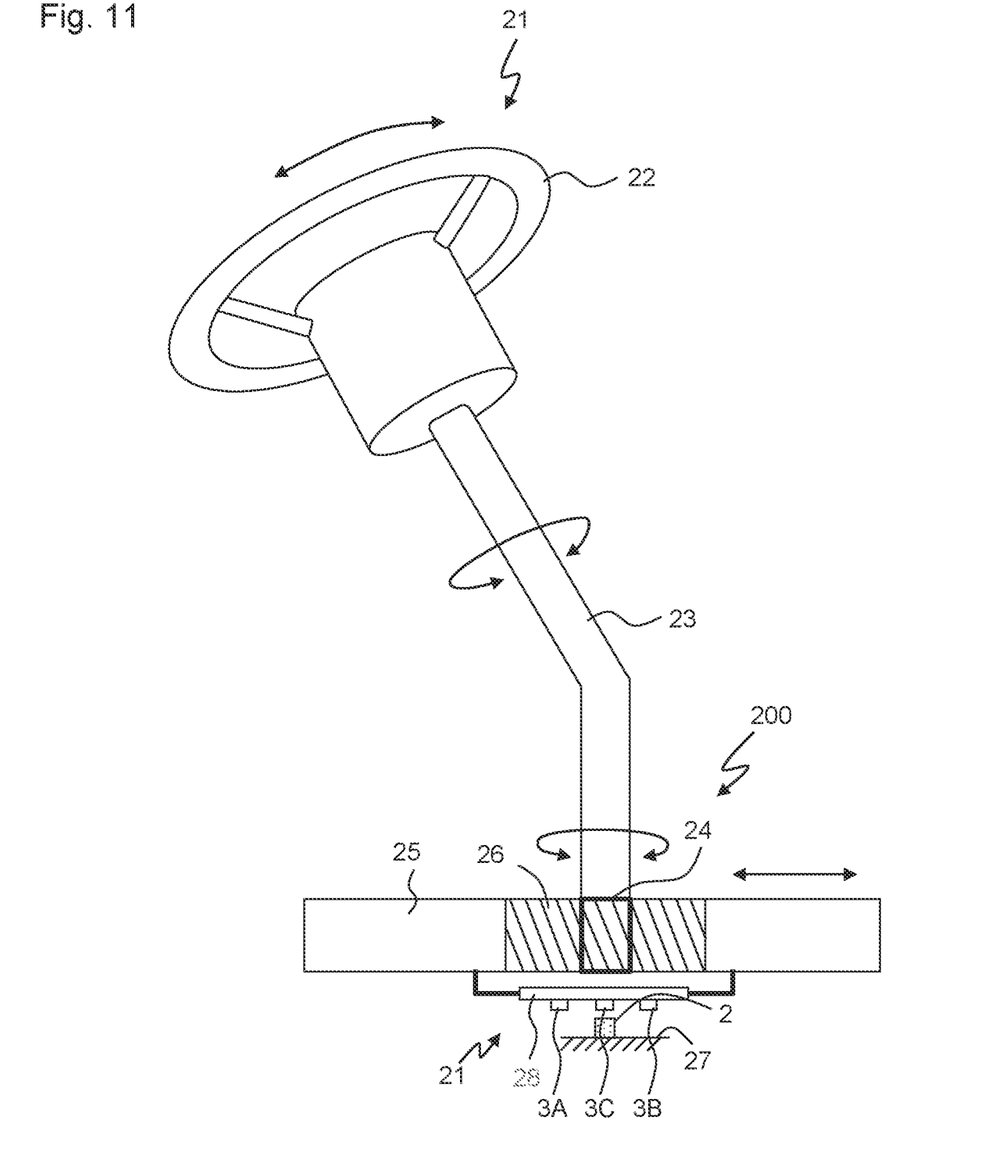
FIG. 11 is schematic view of a steering system of a vehicle in which the magnetic sensor is used as a stroke sensor.

FIG. 11 shows vehicle steering system 21 in which magnetic sensor 1 is used as a stroke sensor. In steering system 21, one end of steering shaft 23 is connected to steering wheel 22, and the other end of steering shaft 23 is provided with pinion gear 24. Pinion gear 24 engages with rack 26 of rod 25 in order to convert the rotational movement of steering shaft 23 to linear movement of rod 25 in the lateral direction of the vehicle. Rod 25 is connected to the front wheels (not illustrated). The linear movement of rod 25 changes the direction of the wheels. First magnets 3A and 3B and second magnet 3C of magnetic sensor 1 are fixed to mounting member 28 that is attached to rod 25. Magnetic field detecting element 2 is fixed to vehicle body 27. Magnetic sensor 1 detects the position of rod 25 in the lateral direction of the vehicle.

Although certain preferred embodiments of the present invention have been shown and described in detail, it should be understood that various changes and modifications may be made without departing from the spirit or scope of the appended claims.

LIST OF REFERENCE NUMERALS 1 magnetic sensor
2 magnetic field detecting element
3A, 3B first magnet
3C second magnet
4A, 4B first soft magnetic body
4C second soft magnetic body
6A to 6C first face 7A to 7C second surface
8A to 8C third surface
11 brake system
21 steering system
X first direction
Y second direction

What is claimed is:

1. A magnetic sensor comprising:
a magnetic field detecting element; and
a plurality of magnets that are arranged at intervals in a first direction, the magnets moving in the first direction relative to the magnetic field detecting element, wherein
the magnets have respective first faces that face the magnetic field detecting element,
the magnets are magnetized in a second direction that crosses the first direction such that the first faces of an adjacent pair of the magnets have different polarities,
the magnetic sensor further comprises soft magnetic bodies,
each soft magnetic body is provided on the first face of a respective one of the magnets,
each soft magnetic body is in line symmetry with respect to an axis that is parallel to the second direction and that passes through a center of one of the soft magnetic bodies,
each soft magnetic body has a curved second surface that faces the magnetic field detecting element and a third surface that is in contact with the first face of the magnet, and the second surface faces the third surface in the second direction, and
a distance in the second direction between the second surface and the third surface is maximized at a center of the soft magnetic body in the first direction and then gradually decreases from the center thereof toward opposite ends thereof in the first direction.

2. The magnetic sensor according to claim 1, wherein each soft magnetic body is provided only on the first face.

3. The magnetic sensor according to claim 1, wherein the opposite ends of the soft magnetic bodies protrude in the first direction from the first face of the magnet.

4. The magnetic sensor according to claim 1, wherein the opposite ends of the soft magnetic bodies are positioned within the first face of the magnet.

5. The magnetic sensor according to claim 1, wherein the magnets include two first magnets, the soft magnetic bodies include two first soft magnetic bodies, and the soft magnetic bodies are provided on respective first magnets.

6. The magnetic sensor according to claim 5, wherein the two first soft magnetic bodies are in line symmetry with respect to an axis that is parallel to the second direction and that is equidistant from the two first soft magnetic bodies.

7. The magnetic sensor according to claim 1, wherein the magnets include a second magnet that is positioned between the two first magnets, the soft magnetic bodies include a second soft magnetic body, and a second soft magnetic body is provided on the second magnet, and wherein the second soft magnetic body is in line symmetry with respect to an axis that is parallel to the second direction and that passes through a center of the second soft magnetic body.

8. The magnetic sensor according to claim 1, wherein a ratio of a height of each soft magnetic body to a height of a respective one of the magnets is 1 or less.

9. The magnetic sensor according to claim 1, wherein a ratio of a height of each soft magnetic body to a height of a respective one of the magnets is 0.5 or less.

10. The magnetic sensor according to claim 1, wherein the magnets have constant sections in the second direction.

11. The magnetic sensor according to claim 1, further comprising a common yoke that interconnects the magnets.

12. The magnetic sensor according to claim 1, wherein the magnetic sensor is included in a stroke sensor of a vehicle brake system, wherein the vehicle brake system further comprises
a brake pedal and
a booster that is connected to the brake pedal,
and wherein the magnets of the magnetic sensor are fixed to the booster.

13. The magnetic sensor according to claim 1, wherein the magnetic sensor is included in a steering system, wherein the steering system further comprises
a steering shaft;
a rod that engages with the steering shaft; and
a vehicle body,
and wherein the magnets of the magnetic sensor are fixed to the vehicle body.

14. The magnetic sensor according to claim 1, wherein the magnets have rectangular parallelepiped shapes.

* * * * *